US006789051B1

(12) United States Patent
Chen et al.

(10) Patent No.: US 6,789,051 B1
(45) Date of Patent: Sep. 7, 2004

(54) METHOD AND APPARATUS FOR PROVIDING A SIMULATION OF A WELDING PROCESS USING INTEGRATED MODELS

(75) Inventors: Xiao Chen, Peoria, IL (US); Yi Dong, Peoria, IL (US); Ashok Nanjundan, Savoy, IL (US)

(73) Assignee: Caterpillar Inc, Peoria, IL (US)

( * ) Notice: Subject to any disclaimer, the term of this patent is extended or adjusted under 35 U.S.C. 154(b) by 777 days.

(21) Appl. No.: 09/667,077

(22) Filed: Sep. 21, 2000

Related U.S. Application Data

(60) Provisional application No. 60/161,816, filed on Oct. 27, 1999.

(51) Int. Cl.[7] .................................................. G06F 17/10
(52) U.S. Cl. ................................ 703/2; 703/7; 706/915; 219/117.1
(58) Field of Search ........................ 700/98, 97; 703/2, 703/6, 7, 1; 219/109, 110, 130.21, 117.1, 130.01, 121.14, 137 PS; 706/915

(56) References Cited

U.S. PATENT DOCUMENTS

| | | | | | |
|---|---|---|---|---|---|
| 4,596,917 | A | * | 6/1986 | Nied et al. | 219/109 |
| 5,033,014 | A | * | 7/1991 | Carver et al. | 703/1 |
| 5,202,837 | A | * | 4/1993 | Coe et al. | 700/98 |
| 5,552,575 | A | * | 9/1996 | Doumanidis | 219/124.34 |
| 5,581,489 | A | * | 12/1996 | Groothuis et al. | 703/2 |
| 5,796,617 | A | * | 8/1998 | St. Ville | 700/98 |
| 6,023,637 | A | * | 2/2000 | Liu et al. | 600/474 |
| 6,186,011 | B1 | * | 2/2001 | Wung et al. | 73/850 |
| 6,263,252 | B1 | * | 7/2001 | St. Ville | 700/98 |
| 6,270,599 | B1 | * | 8/2001 | Wood | 156/64 |
| 6,295,513 | B1 | * | 9/2001 | Thackston | 703/1 |
| 6,324,491 | B1 | * | 11/2001 | Zhang et al. | 703/7 |
| 6,424,879 | B1 | * | 7/2002 | Chilese et al. | 700/121 |
| 6,618,694 | B1 | * | 9/2003 | Shibuya et al. | 703/1 |

FOREIGN PATENT DOCUMENTS

JP          10187769 A   *   7/1998   .......... G06F/17/50

OTHER PUBLICATIONS

M. Nakahira et al., "Evaluation of Welding Deformation on ITER Vacuum Vessel", 18th Symposium on Fusion Engineering, Oct. 25–29, 1999, pp. 245–248.*

Y. Takahashi et al., "Numerical Analysis of the Interfacial Contact Process in Wire Thermocompression Bonding", IEEE Transactions on Components, Packaging, and Manufacturing Technology, Part A, vol. 19, Issue 2, Jun. 1996, pp. 213–223.*

(List continued on next page.)

*Primary Examiner*—Anthony Knight
*Assistant Examiner*—Crystal J. Barnes
(74) *Attorney, Agent, or Firm*—Steve D Lundquist

(57) ABSTRACT

A method and apparatus for providing a simulation of a welding process using integrated models which are interconnected by an interconnection tool to determine stresses and distortions of a material being welded. The method and apparatus includes determining a model of a geometry of a set of materials to be welded, defining a set of coordinates of elements and nodes of the geometry model for a finite element analysis mesh, delivering the finite element analysis mesh coordinates to a thermal analysis model, the thermal analysis model including an analytical solution model and a finite element analysis model, and determining a thermal analysis of the welding process, the thermal analysis responsively providing a thermal history of the welding process. The method and apparatus further includes delivering the thermal history of the welding process to a structural analysis model, and providing a structural analysis of the welding process as a function of the thermal history.

10 Claims, 2 Drawing Sheets

OTHER PUBLICATIONS

XP–000944978, Development of New Welding Patern in Order to Minimise Distortions in Marine . . . , D. Ischenko et al., 1998 pp 849–864.

XP–000944986, Finite element simulation and measurement of welding residual stresses, Wikander et al., 1994 pp 845–864.

A Model for Predicting Residual Stresses in Metal Cutting, Jang and Se, 1990 pp 439–442.

Weld Process Modeling and Its Importance in a Manufacturing Environment, Brust et al., 1998.

* cited by examiner

Fig_1_

METHOD AND APPARATUS FOR PROVIDING A SIMULATION OF A WELDING PROCESS USING INTEGRATED MODELS

This application claims the benefit of prior provisional patent application Serial No. 60/161,816 filed Oct. 27, 1999.

TECHNICAL FIELD

This invention relates generally to a method and apparatus for modeling a welding process and, more particularly, to a method and apparatus for integrating models for a welding process to perform a thermal and structural analysis of the process.

BACKGROUND ART

The process of welding materials has some amount of detrimental effect on the materials being welded. For example, materials being welded are subjected to residual stresses and distortions due to the extreme heat caused by the weld process.

In the past, attempts have been made to analyze and determine the effects of heat on materials from the welding process. One method in particular, the finite element method (FEM), uses finite element analysis to model the weld process, and has been widely used to analyze the thermal effects of welding. However, FEM can be extremely cumbersome to implement and very costly.

Another method used to determine the effects of heat on materials from the welding process incorporates an analytical solution to determine the thermal history of the welding process. For example, analytical solutions have been developed which use the superposition of point heat source solutions. These methods generally do not require the extremely cumbersome finite element analysis techniques previously used, and therefore provide a much more rapid analytical solution procedure. However, analytical methods do not account for such features as weld joint geometry. Furthermore, it may be desired to use both types of thermal models for some applications. For example, an analytical based model may be used for providing rapid, global solutions, and the FEM may be used to provide accurate temperature models for local areas of concern.

The present invention is directed to overcoming one or more of the problems as set forth above.

DISCLOSURE OF THE INVENTION

In one aspect of the present invention a method for providing a simulation of a welding process using integrated models is disclosed. The method includes the steps of determining a model of a geometry of a set of materials to be welded, defining a set of coordinates of elements and nodes of the geometry model for a finite element analysis mesh, delivering the finite element analysis mesh coordinates to a thermal analysis model, the thermal analysis model including an analytical solution model and a finite element analysis model, and determining a thermal analysis of the welding process, the thermal analysis responsively providing a thermal history of the welding process. The method further includes the steps of delivering the thermal history of the welding process to a structural analysis model, and providing a structural analysis of the welding process as a function of the thermal history.

BEST MODE FOR CARRYING OUT THE INVENTION

Figure 1:
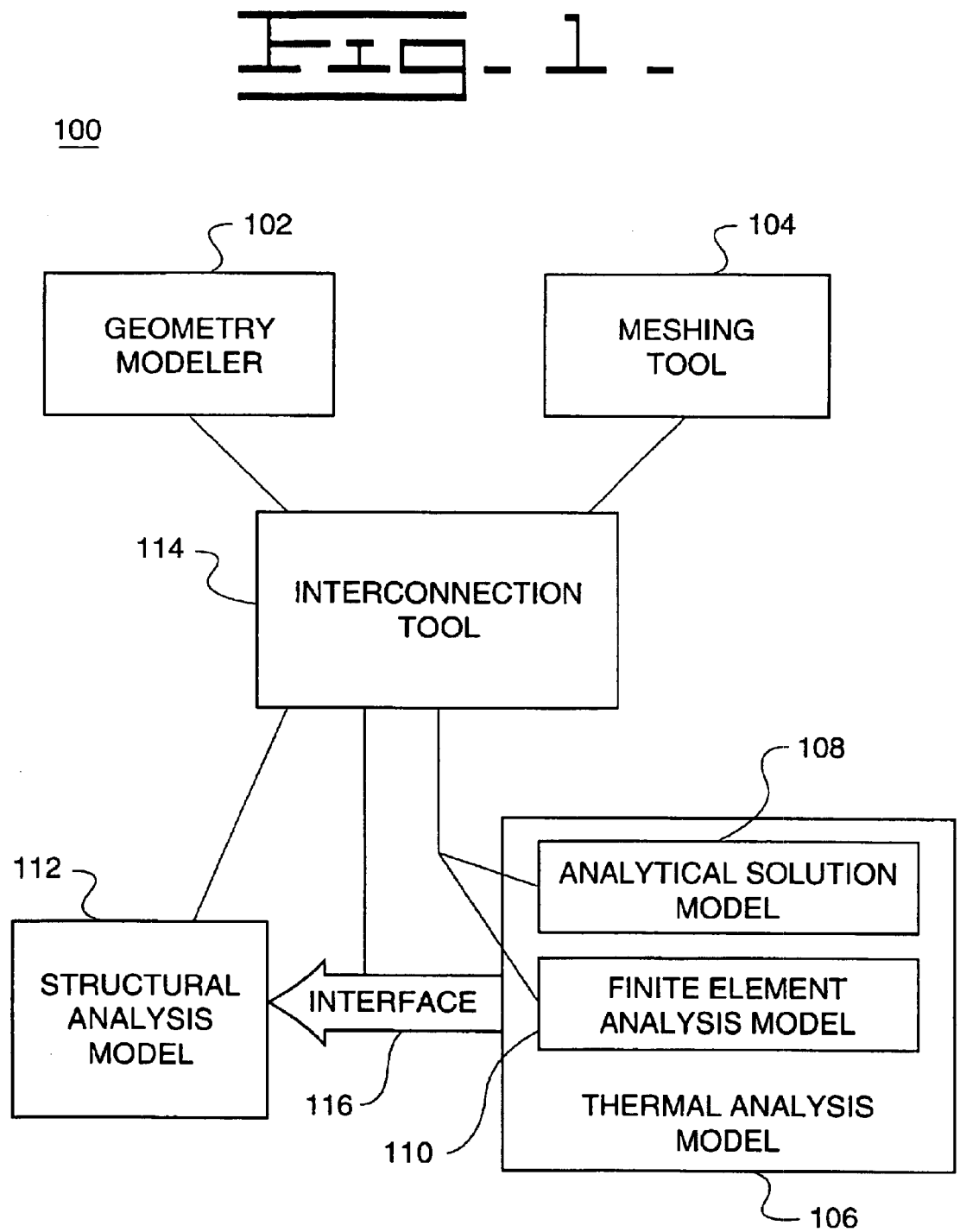
FIG. 1 is a block diagram illustrating a preferred embodiment of the present invention.

Referring to FIG. 1, a block diagram illustrating a preferred embodiment of a set of integrated models 100 for performing a simulation analysis of a welding process is shown. The integrated models 100 work together to determine stresses and distortions of a material which is welded in the welding process. The stresses and distortions have an adverse effect on the strengths and characteristics of the material. Therefore, it is desired to model the stresses and distortions, and use the information from the models to determine methods which may minimize the adverse effects of welding.

In the preferred embodiment, an interconnection tool 114, such as a graphical user interface (GUI), interconnects the models into an integrated network of working models to determine stresses and distortions of the material. The interconnection tool 114 is preferably computer-based and may be configured to operate autonomously, through manual intervention, or some combination of the two modes. For example, the interconnection tool 114 may coordinate the modeling functions while displaying the status and results to a human, who may override the system or input additional information at any desired time.

A geometry modeler 102 determines the geometry model for the materials to be welded. Preferably, the geometry modeler 102 simplifies the geometry by removing unnecessary features of the materials from the model. Examples of such features include, but are not limited to, chamfers, holes, slight irregularities, and the like.

The geometry model data is then delivered to a meshing tool 104. The meshing tool 104 is used to generate a finite element analysis mesh, preferably by defining coordinates for elements and nodes which constitute the mesh. Finite element analysis techniques which use mesh coordinates are well known in the art and will not be described further.

A thermal analysis model 106 is used to perform a thermal analysis of the materials during the welding process. In the preferred embodiment, the thermal analysis model 106 includes at least two models. An analytical solution model 108 provides a rapid analytical solution of the thermal process, i.e., welding process, for a global solution of distortions caused by the welding process. A finite element analysis model 110 provides local detailed analysis of residual stress from the welding process.

In the preferred embodiment, the analytical solution model 108 determines solutions of point heat sources, the point heat sources being obtained from heat input based on welding processes and reflected heat sources determined from adiabatic boundary conditions of the material. The total analytical solution is determined from superposition of all the point heat sources. The principle of obtaining reflected heat sources from adiabatic boundary conditions is well known in the art and will not be discussed further. The analytical solution model 108 provides a rapid solution for the complete welding process. However, the solution is not highly detailed. Therefore, the analytical solution model 108 is typically used when a fast, global solution is desired, and a high degree of detail is not needed.

The finite element analysis model 110 employs numerical computations of conditions at each of the desired node and element coordinates of the finite element analysis mesh. The finite element analysis model tends to be computationally lengthy and intensive. Therefore, the finite element analysis model 110 is generally used only when a detailed analysis of a specific portion of the model is desired.

The information from the thermal analysis model 106 is compiled into a thermal history and delivered to a structural analysis model 112. In addition, the finite element mesh provided by the meshing tool 104 is delivered to the structural analysis model 112. The interconnection is automatically established in the interconnection tool 114. In the preferred embodiment, the thermal history is delivered from the thermal analysis model 106 to the structural analysis model 112 by way of an interface module 116. Preferably, the interface module 116 is automated from the interconnection tool 114 and is adapted to seamlessly connect the thermal solution from the analytical solution model 108, the finite element analysis model 110, or both, to the structural analysis model 112.

The structural analysis model 112 provides further analysis of the materials during the welding process. Typically, the behavior of the material during welding is analyzed and modeled. Examples of features analyzed include, but are not limited to, melting and remelting of the material, phase transformation of the material, cyclic effects of multiple weld passes, and the like. The stresses and distortions of the material are determined by the structural analysis model. Preferably, the determined stresses and distortions may be further analyzed and subsequently used to modify the welding process to reduce the adverse effects of the extreme heat associated with welding.

Industrial Applicability

Figure 2:
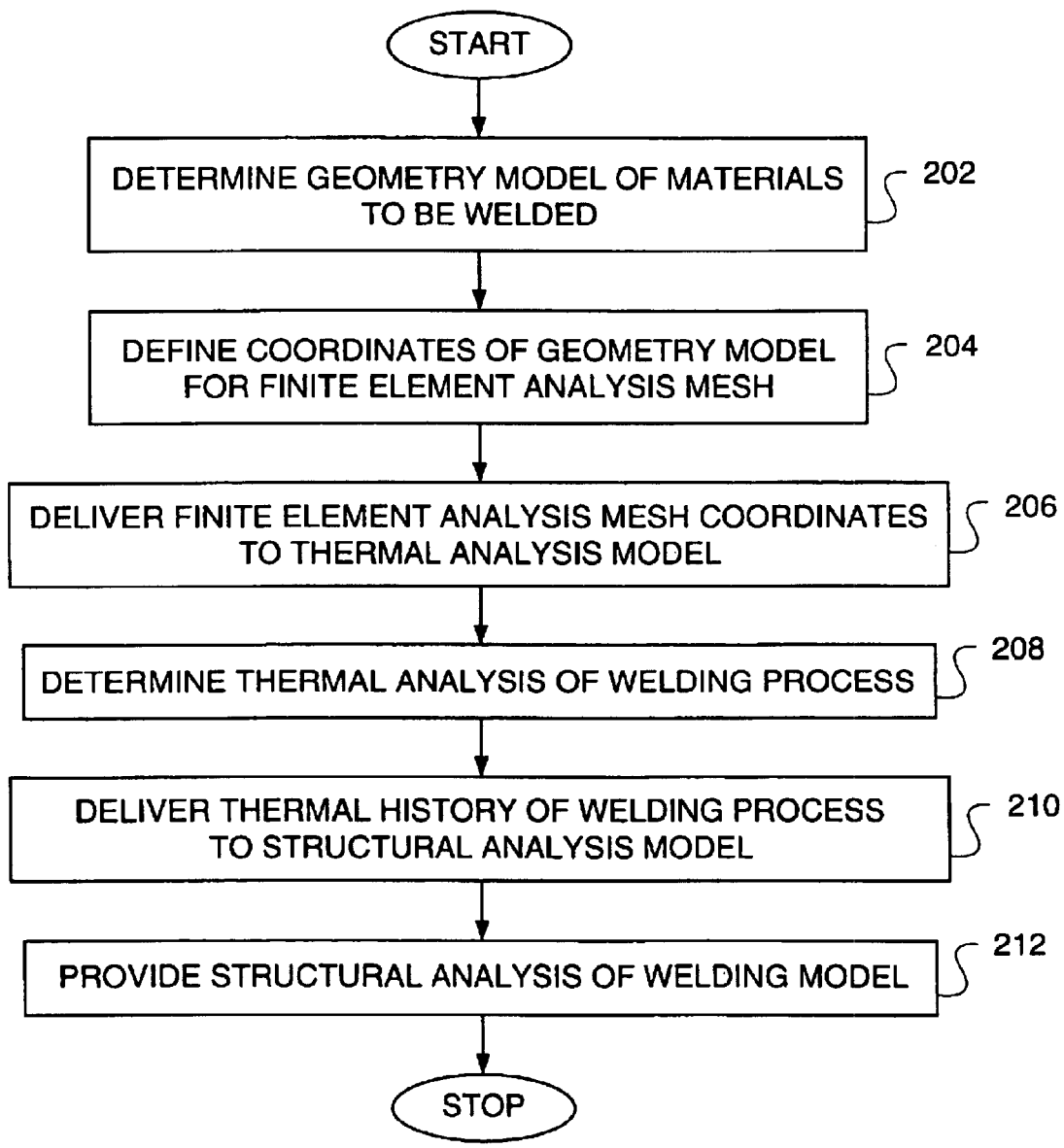
FIG. 2 is a flow diagram illustrating a preferred method of the present invention.

As an example of an application of the present invention, reference is made to FIG. 2, a flow diagram illustrating a preferred method of the present invention.

In a first control block 202, a model of the geometry of a set of materials to be welded is determined. In a second control block 204, a set of coordinates of elements and nodes of the geometry model is defined for a finite element analysis mesh. In a third control block 206, the finite element analysis mesh coordinates are delivered to a thermal analysis model 106. In the preferred embodiment, the thermal analysis model 106 includes an analytical solution model 108 and a finite element analysis model 110.

In a fourth control block 208, a thermal analysis of the welding process is determined as a function of at least one of the analytical solution model 108 and the finite element analysis model 110. The thermal analysis preferably provides a thermal history of the welding process. In a fifth control block 210, the thermal history of the welding process is delivered to a structural analysis model 112. In a sixth control block 212, a structural analysis of the welding process as a function of the thermal history is provided. Preferably, the structural analysis includes information related to stresses and distortions caused by the welding process. This information may be used to develop methods and techniques to modify the welding process to minimize the stresses and distortions produced during subsequent welds.

Other aspects, objects, and features of the present invention can be obtained from a study of the drawings, the disclosure, and the appended claims.

What is claimed is:

1. A method for providing a simulation of a welding process using integrated models, the integrated models being interconnected by an interconnection tool to determine stresses and distortions of a material being welded, including the steps of:

determining a model of a geometry of the material;

defining a set of coordinates of elements and nodes of the geometry model for a finite element analysis mesh;

delivering the finite element analysis mesh coordinates to a thermal analysis model, the thermal analysis model including an analytical solution model and a finite element analysis model;

determining a thermal analysis of the welding process as a function of at least one of the analytical solution model and the finite element analysis model, the analytical solution model being adapted to provide a thermal history of the welding process for a global distortion analysis, and the finite element analysis model being adapted to provide a thermal history of the welding process for a detailed residual stress analysis;

delivering the thermal history of the welding process to a structural analysis model; and providing a structural analysis of the welding process as a function of the thermal history.

2. A method, as set forth in claim 1, wherein providing a thermal history of the welding process for a detailed residual stress analysis includes the step of providing a thermal history of the welding process for a specific portion of the welding process.

3. A method, as set forth in claim 1, wherein providing a structural analysis of the welding process includes the step of modeling a set of characteristics of the materials being welded during the welding process.

4. A method, as set forth in claim 3, wherein characteristics of the materials include residual stresses and distortions.

5. A method, as set forth in claim 1, wherein determining a thermal analysis of the welding process as a function of the analytical solution model includes the steps of:

determining a set of adiabatic boundary conditions of the material being welded;

determining a set of reflected heat sources as a function of the adiabatic boundary conditions;

determining a set of point heat sources as a function of the reflected heat sources; and determining a total analytical solution from superposition of the point heat sources.

6. A method, as set forth in claim 1, wherein determining a thermal analysis of the welding process as a function of the finite element analysis model includes the step of determining a set of numerical computations of conditions at each desired node and element coordinate of the finite element analysis mesh.

7. A method, as set forth in claim 1, wherein delivering the thermal history of the welding process to a structural analysis model includes the step of delivering the thermal history by way of an interface module.

8. An apparatus for providing a simulation of a welding process using integrated models, the integrated models being interconnected by an interconnection tool to determine the stresses and distortions of a material being welded, comprising:

a geometry modeler adapted to determine a model of a geometry of the material;

a meshing tool adapted to define a set of coordinates of elements and nodes of the geometry model for a finite element analysis mesh;

a thermal analysis model adapted to receive the finite element analysis mesh, determine a thermal analysis of the welding process, and responsively provide a thermal history of the welding process, wherein the thermal analysis model includes:

an analytical solution model adapted to provide a thermal history of the welding process for a global distortion analysis; and a finite element of analysis model adapted to provide a thermal history of the welding process for a detailed residual stress analysis; and a structural analysis model adapted to provide a structural analysis of the welding process as a function of the thermal history.

9. An apparatus, as set forth in claim 8, wherein the interconnection tool is a graphical user interface.

10. A method for determining a thermal analysis of a welding process as a function of an analytical solution model for use in a simulation of a welding process, including the steps of:

determining a set of adiabatic boundary conditions of a material being welded;

determining a set of reflected heat sources as a function of the adiabatic boundary conditions;

determining a set of point heat sources as a function of the reflected heat sources;

determining a total analytical solution from superposition of the point heat sources;

determining a thermal analysis of the welding process as the total analytical solution and one of an analytical solution model or a finite element analysis model, the analytical solution model being adapted to provide a thermal history of the welding process for a global distortion analysis, and the finite element analysis model being adapted to provide a thermal history of the welding process for a detailed residual stress analysis;

delivering the thermal history of the welding process to a structural analysis model; and providing the structural analysis of the welding process as a function of the thermal history.

* * * * *